(12) United States Patent
Michel (10) Patent No.: US 7,976,030 B2
(45) Date of Patent: Jul. 12, 2011

(54) DEVICE FOR ADJUSTING THE HEIGHT OF THE BODY OF A MOTOR VEHICLE

(75) Inventor: Wilfried Michel, Fichtenweg (DE)

(73) Assignee: Audi AG, Ingolstadt (DE)

( * ) Notice: Subject to any disclaimer, the term of this patent is extended or adjusted under 35 U.S.C. 154(b) by 136 days.

(21) Appl. No.: 12/463,667

(22) Filed: May 11, 2009

(65) Prior Publication Data

US 2009/0283977 A1 Nov. 19, 2009

(30) Foreign Application Priority Data

May 16, 2008 (DE) .......................... 10 2008 023 891

(51) Int. Cl.
*B60G 17/033* (2006.01)
(52) U.S. Cl. ................. 280/6.157; 280/5.514; 280/6.15; 267/177; 267/221
(58) Field of Classification Search ............... 280/6.157, 280/6.15, 43.17, 43, 5.514, 5.515, 5.519; 267/175, 177, 221
See application file for complete search history.

(56) References Cited

U.S. PATENT DOCUMENTS

| | | | | |
|---|---|---|---|---|
| 3,414,278 A * | 12/1968 | Schmid | ....................... | 280/5.514 |
| 4,235,426 A * | 11/1980 | Sullivan et al. | ............... | 267/220 |
| 5,697,634 A * | 12/1997 | Kamimae et al. | ...... | 280/124.108 |
| 6,550,394 B1 * | 4/2003 | Polley | ........................... | 105/164 |
| 6,637,348 B1 * | 10/2003 | Teichmann et al. | ............ | 105/453 |
| 6,676,119 B2 * | 1/2004 | Becker et al. | .................. | 267/218 |
| 6,948,728 B2 * | 9/2005 | Pflugner et al. | ......... | 280/124.147 |
| 7,243,606 B2 * | 7/2007 | Hommen et al. | .............. | 105/453 |
| 7,392,978 B2 * | 7/2008 | Carlitz et al. | .................. | 267/221 |
| 7,644,935 B2 * | 1/2010 | Munster et al. | ............ | 280/5.514 |
| 2004/0036206 A1 * | 2/2004 | Loser et al. | .................... | 267/218 |
| 2004/0232648 A1 * | 11/2004 | Ohki | ...................... | 280/124.164 |
| 2006/0163787 A1 * | 7/2006 | Munster et al. | ................ | 267/221 |
| 2006/0163863 A1 * | 7/2006 | Ellmann et al. | ................ | 280/788 |
| 2006/0175776 A1 * | 8/2006 | Christophel et al. | ......... | 280/6.157 |
| 2007/0170684 A1 * | 7/2007 | Ohkita et al. | ........... | 280/124.147 |
| 2007/0210539 A1 * | 9/2007 | Hakui et al. | ................ | 280/5.514 |

(Continued)

FOREIGN PATENT DOCUMENTS

DE 10 2006 032 178 A1 1/2008

(Continued)

OTHER PUBLICATIONS

Penot et al., Axle with a torsion bar suspension and level adjustment, Nov. 23, 1998, EPO, EP 0292392A1, English Abstract.*

*Primary Examiner* — Paul N Dickson
*Assistant Examiner* — James English
(74) *Attorney, Agent, or Firm* — Novak Druce + Quigg LLP (57) ABSTRACT

The invention relates to a device for adjusting the height of the body of a motor vehicle having a bearing spring which is connected between the wheel guiding element of the wheel suspension and the body and which is supported on a spring disk which is vertically adjustable by way of an actuating device, and having an overload spring which limits a defined spring path in the deflection direction. According to the invention, the overload spring is assigned an actuating device with which the overload spring is vertically adjustable, preferably following the vertical adjustment of the spring disk.

19 Claims, 4 Drawing Sheets

U.S. PATENT DOCUMENTS

| | | | |
|---|---|---|---|
| 2008/0210119 A1 * | 9/2008 | Lehmair et al. | 105/199.3 |
| 2008/0217873 A1 * | 9/2008 | Feuchtner et al. | 280/5.515 |
| 2009/0045595 A1 * | 2/2009 | Michel | 280/6.157 |
| 2009/0057969 A1 * | 3/2009 | Michel | 267/218 |
| 2009/0072460 A1 * | 3/2009 | Michel | 267/225 |
| 2009/0108546 A1 * | 4/2009 | Ohletz et al. | 280/6.16 |
| 2009/0146385 A1 * | 6/2009 | Michel | 280/5.514 |
| 2009/0230640 A1 * | 9/2009 | Michel | 280/6.157 |

FOREIGN PATENT DOCUMENTS

| | | |
|---|---|---|
| EP | 0292382 A1 * | 11/1988 |
| EP | 1864836 A2 * | 12/2007 |
| JP | 11108100 A * | 4/1999 |
| JP | 2001080336 A * | 3/2001 |

* cited by examiner

DEVICE FOR ADJUSTING THE HEIGHT OF THE BODY OF A MOTOR VEHICLE

BACKGROUND OF THE INVENTION

A height adjustment device of the generic type is described, for example, in WO 2006/012858 A1. Laterally from the telescoping shock absorber of a McPherson strut unit wheel suspension there is an electric motor which by way of a toothed-gear drive turns the bearing spring disk which is made as a ring nut. The ring nut is located on a threaded section of the shock absorber tube. Turning the ring nut by means of the electric motor can adjust the height of the body of the motor vehicle, for example, from a high level position by way of a normal level position into a low level position. The bearing spring here is turned with the ring nut as the level is being set, the spring constant as such remains essentially unchanged. If in such a wheel suspension there is an overload spring which limits the deflection path, for example, a rubber-elastic stop buffer, the spring path of the wheel suspension is changed by the overload spring which moves into the active position sooner or later with respect to the normal level position.

In another known height adjustment device, the base of the bearing spring, i.e., the body-side spring disk, is likewise changed in height and thus the height of the vehicle over the roadway is changed. The actuator necessary for this purpose is located partially within the longitudinal member of the body which has been changed for this purpose. The required actuator is an electrically driven ball screw. The assigned ball screw spindle is caused to rotate by way of a gear stage by an electric motor which is located within the spindle. The nut which is connected to the adjustable spring disk accordingly executes a lifting motion. In this way, the bearing spring moves the wheel carrier into the vertical position which is dictated by the control. The bearing spring itself remains unchanged in its length in the respectively examined loading state. After the adjustment process, a trip-free mechanism prevents the vehicle from sinking by its own weight in the de-energized state due to the ball screw which is not self-locking. The deflection path of the wheel is determined by the body-side overload spring which is located in the upper shock absorber receiver. In contrast, the rebound path of the wheel is determined by a tension stop which is located in the shock absorber itself.

DE 10 2004 018 701 B3 furthermore discloses variably limiting the deflection path of the wheel suspension for motor vehicles by the overload spring being supported on the telescoping shock absorber by way of an electrical actuating motor in two positions which are axially offset to one another on the body of the motor vehicle. This is intended to prevent the wheel rubbing against the inside of the wheel housing of the body of the vehicle and causing damage at larger wheel circumferences, for example, by mounting snow chains.

The object of the invention is to propose a device for adjusting the height of the body of a motor vehicle which, with structurally simple means, enables greater mechanical degrees of freedom in the design of the bearing spring and overload spring with consideration of favorable spring paths of the wheel suspension.

SUMMARY OF THE INVENTION

According to the invention, the overload spring is provided with an actuating device, with which it is likewise vertically adjustable, preferably following the vertical adjustment of the adjustable spring disk. In this way, when the height of the body is adjusted, the overload spring can also be adjusted to maintain the essentially same deflection path. Preferably, the overload spring can be adjusted in height dynamically coupled to the adjustable spring disk. To save installation space it is especially favorable if both the overload spring and also the adjustable spring disk are adjustable in height by means of a common actuating device.

The overload spring can preferably be coupled to the actuating device of the height adjustment device such that with adjustment of the height of the body the overload spring is also adjusted to maintain an essentially identical spring path.

Thus, with structurally simple means, the use of the overload spring is caused to follow the height adjustment and ensures an essentially identical spring path which avoids full compression of the bearing spring over the spring path and ensures an even more uniform spring constant over the spring path. A separate actuating motor on the overload spring can be omitted. Moreover, this, in contrast to separately attached drives, eliminates malfunctioning by the driving connection of the two adjustment members. The correct adjustment path is therefore always imposed on the overload spring.

The overload spring can be conventionally located between the body-side shock absorber bearing of a telescoping shock absorber of the wheel suspension and its shock absorber cylinder and can be axially adjustable by way of the actuating device. The overload spring could, however, also be positioned elsewhere between the body and the wheel suspension element.

In particular, the overload spring can be axially movable by way of a positioning drive, the positioning drive being drivingly connected to the actuating device of the bearing spring. The connection can be produced, e.g., by way of a correspondingly designed lever mechanism, etc.

The actuating device can furthermore be an electric-motorized actuator with a ball screw which acts on the bearing spring and whose threaded nut, which is axially movable by way of a rotatable threaded spindle, interacts with the adjustable spring disk of the bearing spring, the threaded spindle being drivingly coupled to the positioning drive of the overload spring. This enables integration and coupling of the positioning drive of the overload spring with the actuating device on the bearing spring, which integration and coupling is favorable to production technology.

Depending on the choice of thread pitch ratios between the ball screw to the threaded sleeve in the shock absorber receiver and/or the transmission ratios of the two gear stages, the corresponding adjustment path occurs on the overload spring from the specification of the adjustment path on the level position.

In one advantageous aspect of the invention, for a wheel suspension with a bearing spring and overload spring located spatially separately from one another, the positioning drive of the overload spring and the actuating device of the bearing spring can be coupled to one another by means of a flexible, torsion-resistant strong shaft. By using a flexible shaft as the transmission means, the bearing spring and the overload spring can be designed and arranged without construction constraints and mechanical compromises and a durable connection can be established.

Furthermore, the positioning drive of the overload spring can be formed by an economical threaded drive with a threaded sleeve which is supported on the body side and a threaded nut which can be turned to the sleeve and which holds the overload spring, and the threaded nut can be turned by way of a toothed-gear drive. The axially acting overload spring forces can be reliably supported by the self-locking effect of the threaded drive or are fed into the body of the motor vehicle.

Advantageously, the threaded spindle of the ball screw can furthermore output to the positioning drive of the overload spring by way of a toothed-gear drive. Accordingly, the threaded spindle can also actuate the positioning drive of the overload spring in a structurally uniform manner and thus with little additional production engineering effort.

The toothed-gear drives on the actuating device and/or on the positioning drive of the overload spring can be spur gear drives whose pinions are drivingly interconnected by way of the flexible shaft.

A structure which is advantageous, especially for the rear axle of the vehicle, provides for the bearing spring and the actuating device on the body side being located and coupled to the lower longitudinal member of the body of the vehicle and the shock absorber is located and coupled higher on the side wall which adjoins the longitudinal member and that the gear drives of the overload spring and the actuating device are coupled to one another by way of a flexible shaft which extends more or less perpendicular and parallel to the side wall.

Finally, especially advantageous joining of the bearing spring and the shock absorber is created by the bearing spring being supported on the wheel suspension side on an extension arm of the wheel carrier of the wheel suspension, which arm is aligned roughly horizontally and to the vertical longitudinal center plane of the vehicle, while the shock absorber with its shock absorber tube is articulated to the bracket of the wheel carrier which lies above it.

DETAILED DESCRIPTION OF THE PREFERRED EMBODIMENTS OF THE INVENTION

Figure 1:
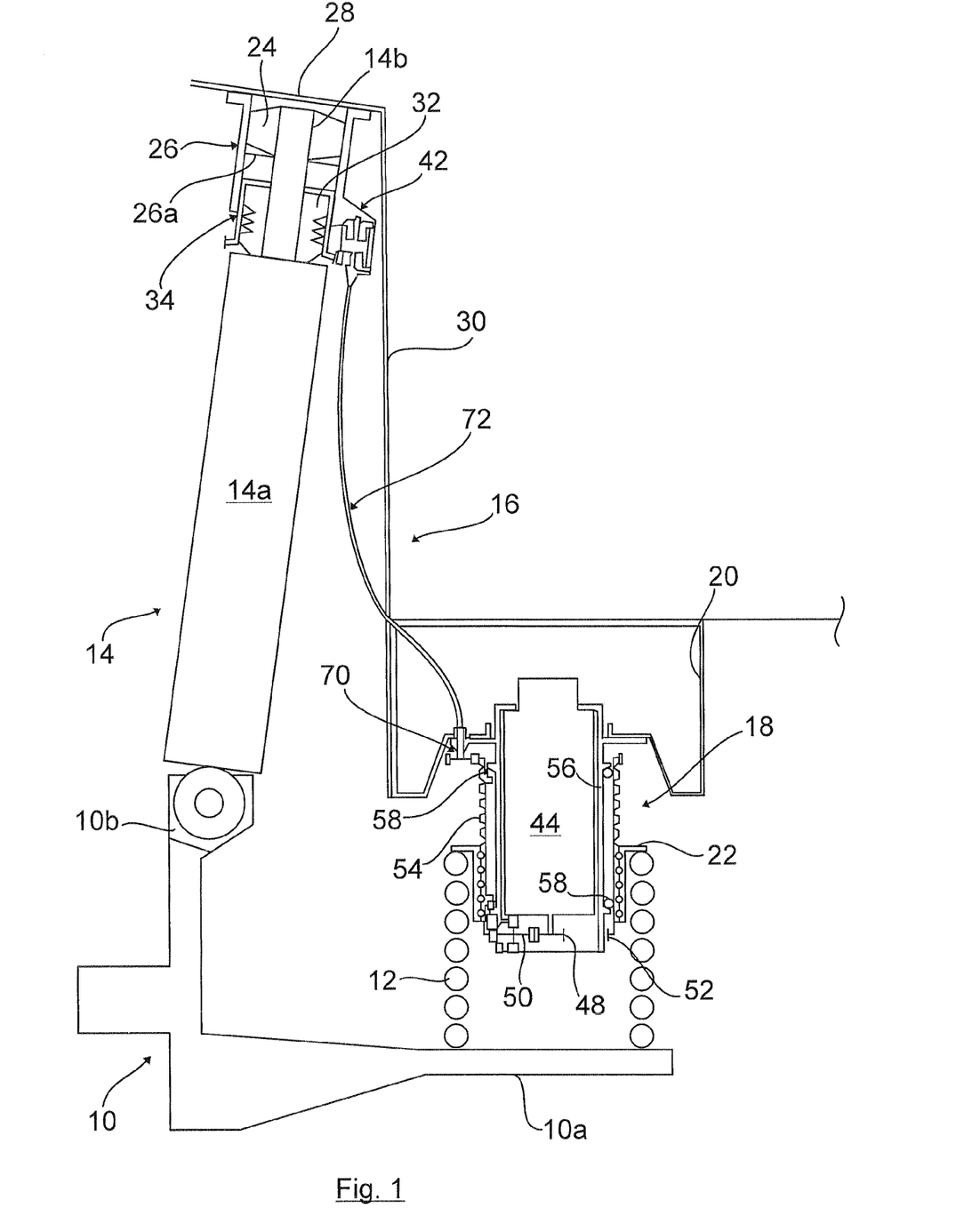
FIG. 1 shows a vertical cross section through the wheel suspension in a motor vehicle, with a representation of the wheel carrier, a telescoping shock absorber and a bearing spring which is supported on the longitudinal member, and with an actuating device for adjusting the height of the body of the motor vehicle and a positioning drive which is coupled to the actuating device for an overload spring.

FIG. 1 shows roughly schematically the wheel carrier 10 of a wheel suspension or a rear axle which is only partially visible and which on its lower region has an extension arm 10a which projects to the inside toward the center of the vehicle, and on which a helical compression spring as the bearing spring 12 is supported.

The wheel carrier 10 is furthermore provided with an upper bracket 10b to which the shock absorber tube 14a of a telescoping shock absorber 14 is coupled.

The wheel carrier 10 conventionally bears a pivoted wheel (not shown) and is coupled to the body 16 of the vehicle by way of wheel guiding elements which are also not shown, such as transverse control arms, transversal swinging arms, etc.

The bearing spring 12 is supported on the body side by way of an actuating device 18 which is still to be described, on a longitudinal member 20, the bearing spring 12 adjoining an adjustable spring disk 22 which can be displaced axially relative to the body 16. By axial displacement of the adjustable spring disk 22 up or down, the height of the body of the vehicle is adjusted proceeding from the normal level position into the high level position (e.g., cross-country driving) or into a low level position for driving at high speeds.

The shock absorber 14 is coupled to an annular bracket 26 by way of its piston rod 14b and a rubber-elastic shock absorber bearing 24, which bracket 26 is in turn attached to a more or less horizontally extending support wall 28 of the body 16.

The support wall 28 adjoins an essentially vertically aligned side wall 30 which on the other end is securely joined to the longitudinal member 20 which is lying lower. The components 20, 30, 28 are facing the wheel housing (not shown) of the body of the vehicle which encompasses the wheel or form parts of this wheel housing.

Between the shock absorber bearing 24 or the annular wall 26a of the bracket 26 (also compare FIG. 2) and the shock absorber tube 14a, around the piston rod 14b there is a rubber-elastic stop buffer or an overload spring 32 which is designed in its axial length and arrangement such that it takes effect for a defined deflection path and, as the total spring constant conventionally increases progressively, is used as spring path limitation.

The rebound path limitation (not shown) can be defined, for example, by a tension stop in the shock absorber 14 or in some other way.

Figure 2:
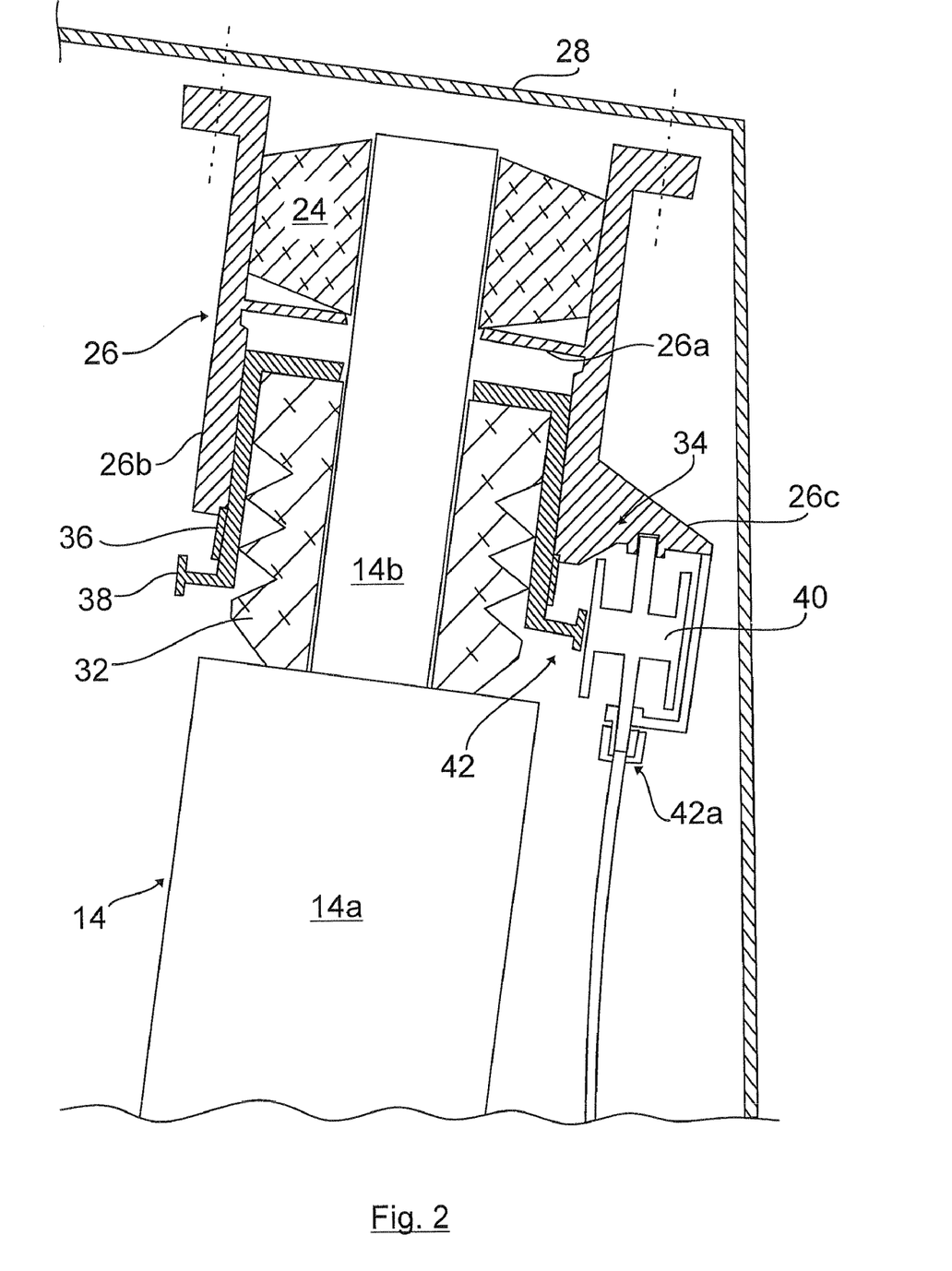
FIG. 2 shows in an enlargement the positioning drive of the overload spring as shown in FIG. 1.

The overload spring 32 is located on the bracket 26 to be axially adjustable by way of a positioning drive 34. For this purpose, the overload spring is supported in a rotationally symmetrical threaded nut 36 which is more or less hat-shaped in cross section and which has an outside thread with a pitch which lies in the self-locking range.

The threaded nut 36 interacts with a threaded sleeve 26b molded onto the bracket 26, with a corresponding internal thread.

Furthermore, on the threaded nut 36 a spur gear 38 is formed which engages a pinion 40. The pinion 40 is pivoted in a housing section 26c of the bracket 26.

The spur gear 38 and the pinion 40 form a toothed-gear drive 42 by means of which the overload spring 32 can be axially adjusted by turning the threaded nut 36 in order to form a variable deflection path limitation.

The actuating device 18 is formed by an electric-motor actuator which is composed essentially (compare FIGS. 1 and 3) of an electric motor 44 and a ball screw 46.

Figure 3:
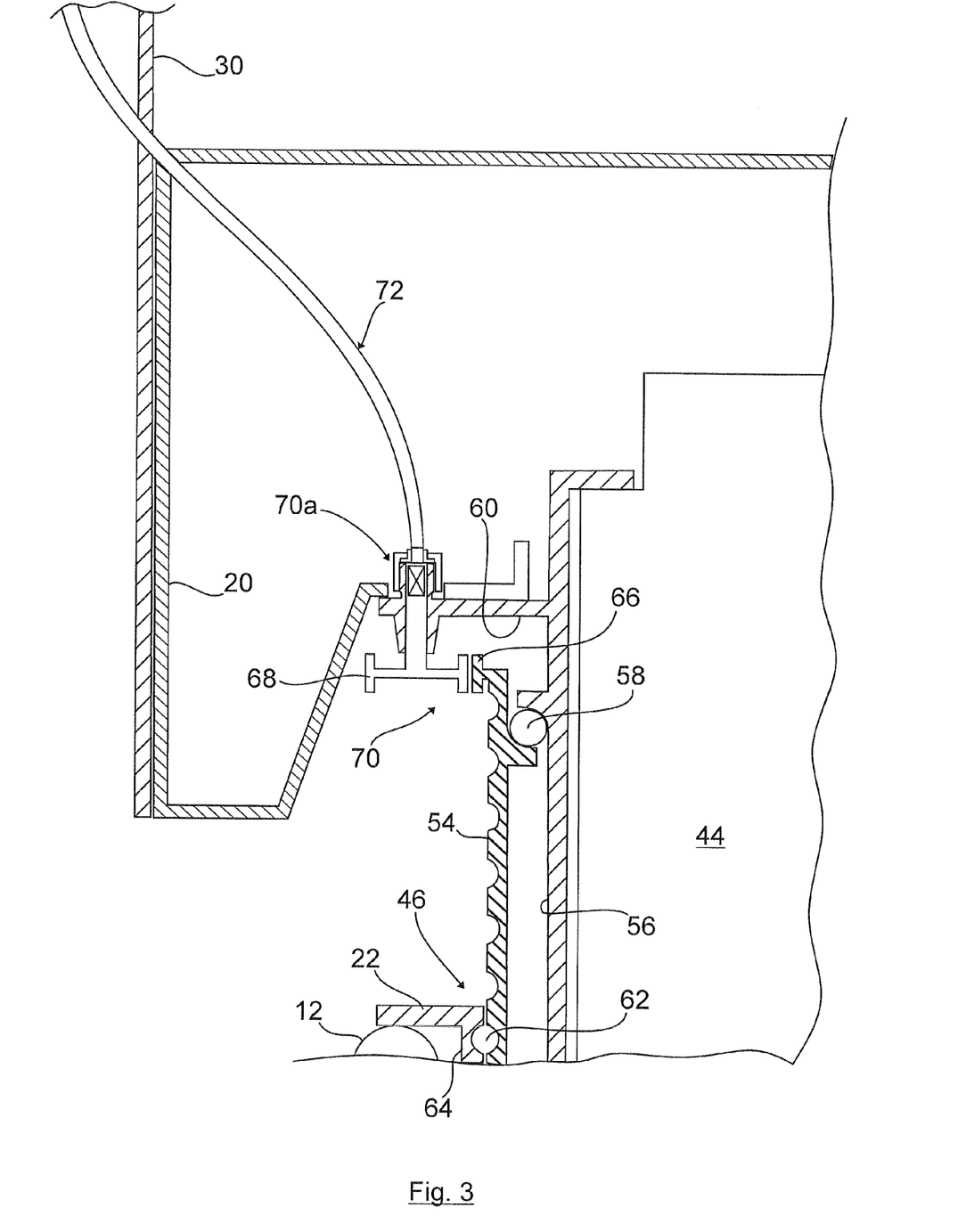
FIG. 3 shows in a likewise enlarged representation the gear drive of the actuating device for axial following of the overload spring by way of its actuating device, FIG. 4 schematically shows a comparison example which is not encompassed by the invention, in which the overload spring is not vertically adjustable.

The electric motor 44 by way of spur gears 48, 50 and an internal gear ring 52 (FIG. 1) drives a threaded spindle 54 which is supported in a rotational and axially immovable manner on a guide bush 56 which bears the electric motor 44 by way of antifriction bearings 58 or sloped shoulder ball bearings. The guide bush 56 is molded onto the base plate 60 by way of which the entire actuating device 18 is attached to the longitudinal member 20.

With the interposition of balls 62 the threaded nut 64 is supported on the threaded spindle 54 and can thus conventionally be axially moved by turning the threaded spindle 54. The threaded nut 64 is made in one piece with the adjustable spring disk 22 which holds the threaded nut 64 nonrotatably and on which the bearing spring 12 is supported.

The electric motor 44 is provided with a brake and/or a switchable trip-free mechanism (not shown) in order to preclude unintentional rotation of the threaded spindle 54 when the electric motor 44 has not been activated.

A gear ring 66 is molded to the threaded spindle 54 on its upper face side and adjacent to the upper antifriction bearing 58 and forms an output toothed-gear drive 70 with a pinion gear 68. The pinion gear 68 is pivoted in the base plate 60.

The two gear drives 42, 70 are propulsively connected to one another by means of a flexible, torsion-resistant shaft 72.

The flexible shaft 72 is produced conventionally by a core of twisted steel wires and an enveloping, likewise flexibly made metal tube and extends as is apparent from FIG. 1 proceeding from the gear drive 70 through the longitudinal member 20 and then extending more or less vertically along the side wall 30 to the gear drive 42 which lies higher.

As in the known speedometer shafts of motor vehicles, the flexible shaft 72 can be drivingly connected to the pinion gears 68, 40 with union nuts by way of clutch connections 42a, 70a which are positive in the direction of rotation and thus the shaft can be easily mounted and dismounted.

Figure 4:
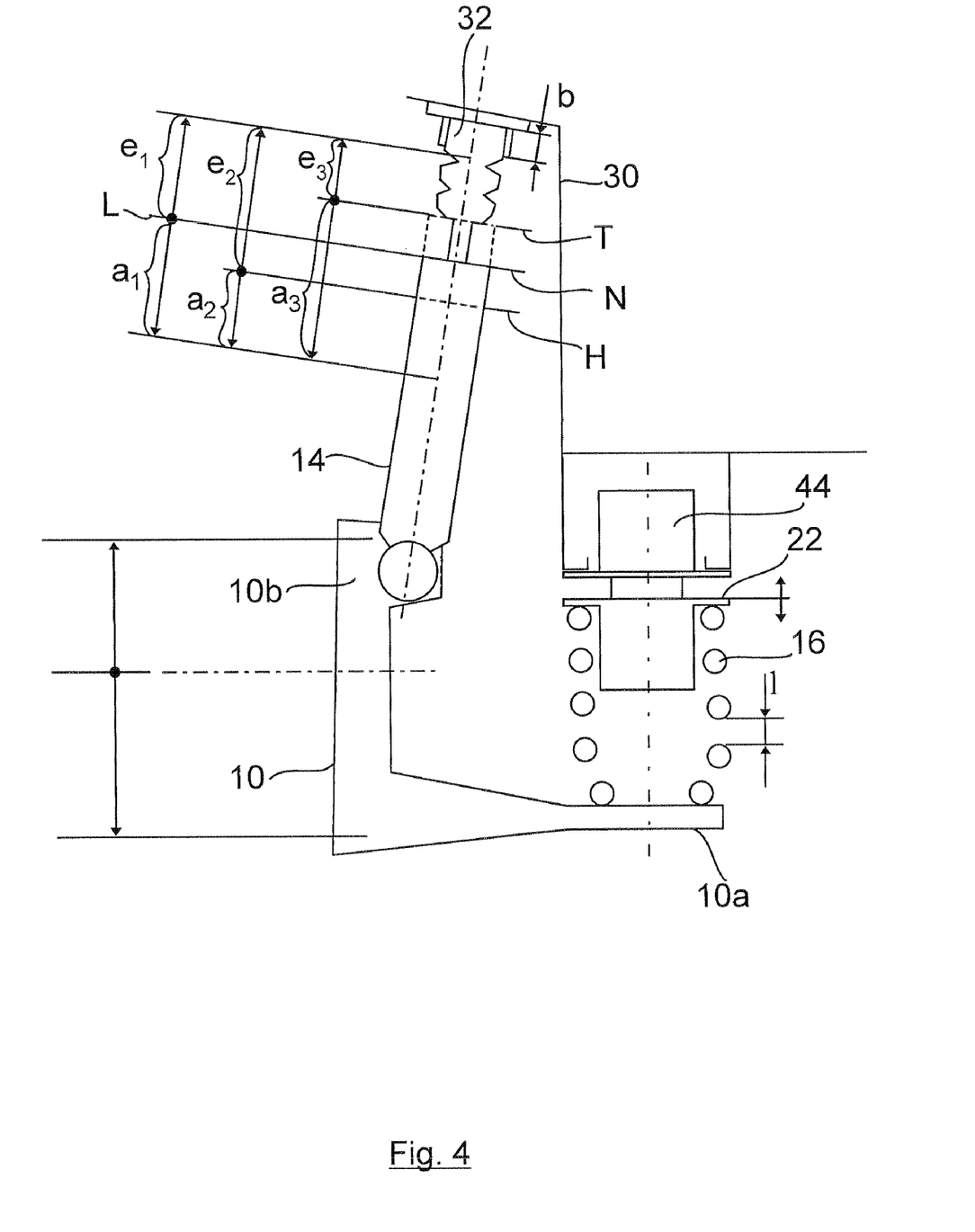

How the invention works in the adjustment of the height of the adjustable spring disk 22 is described below. For better understanding of the invention, however, using the comparison example which is not encompassed by the invention and which is shown in FIG. 4, first the adjustment of the height of the adjustable spring disk 22 is described. As shown in FIG. 4, the overload spring 32 cannot be adjusted at the same time with the adjustable spring disk 22 of level adjustment. Aside from the overload spring 32 which is not adjustable in height, the comparison example shown in FIG. 4 in structure and manner of operation corresponds to the embodiment shown in FIGS. 1 to 3. Reference is made to the description of the embodiment in this respect.

As is apparent from FIG. 4, for the different height levels of the vehicle which are adjustable by means of the adjustable spring disk 22, specifically, a low level T, a normal level N and a high level H, the deflection paths $e_1$ to $e_3$ and the rebound paths $a_1$ to $a_3$ are shown, proceeding from the empty state L of the vehicle. Thus, for example, in the normal level position N both a specific deflection path $e_1$ and also a specific rebound path $a_1$ are stipulated. The deflection path $e_1$ is limited by the overload spring 32, i.e., its full compression b, up to which the overload spring 32 can be compressed.

So that the working capacity of the spring/shock absorber arrangement shown in FIG. 4 is not adversely affected, at the high level H the touching of the overload spring turns which are spaced by way of the turn clearance I with the shock absorber arrangement completely deflected must be avoided. Likewise, at the low level T, even after overcoming the large rebound path $a_3$, lifting of the bearing spring 16 with the shock absorber arrangement completely rebounded must be avoided.

Against this background, the bearing spring 16 should not be too short in order to avoid the danger of lifting in the rebounded state at the low level T, i.e., a residual pretensioning force, for example 500 N, must be ensured. Moreover, it is necessary for the bearing spring 16 not to exceed the allowable stresses at any operating point. Accordingly, the bearing spring 16 should not be too long either, so that in the high level position H with complete deflection the turns do not touch, i.e., a sufficiently large turn clearance I still prevails.

Therefore, while maintaining the full spring paths, as shown in FIG. 4 the bearing spring 16 would have to execute far larger strokes by bilateral displacement from the empty position L than are geometrically possible. This means that the bearing spring 16, for example, in the low level position T must effect more rebound path $a_3$ and at the same time in the high level position H more deflection path $e_2$. Both boundary conditions could, however, only be "virtually" satisfied by the bearing spring.

In order to manage this problem, the deflection and rebound path would have to be limited in order to avoid the turns' touching for the bearing spring 16 and to avoid lifting of the bearing spring 16.

One possibility, which is not encompassed by the invention, consists in lengthening the overload spring 32 by a certain amount. For the critical case "complete deflection and high level position H" this compromise is acceptable since to the extent the high level H is set, the vehicle may potentially be moving cross-country. In this driving state it is of course not desirable for the complete deflection path $e_2$ to be available. Here, it is quite reasonable not to allow the vehicle to deflect to the original, minimal ground clearance.

But this lengthening of the overload spring 32 in the low level position T and in the normal level position N is disadvantageous. Both in the normal level and also in the low level position, the deflection path specifically is limited likewise by the same amount as in the high level position H, i.e., spring path is lost.

The aforementioned disadvantages can be eliminated by means of the dynamic coupling according to the invention between the overload spring 32 and the adjustable spring disk 22, as a result of which both are vertically adjusted at the same time.

For an exemplary adjustment of the body of the vehicle, for example, from the normal level N into the high level position H the threaded spindle 54 of the ball screw 46 is turned by the corresponding triggering of the electric motor 44, the threaded nut 64 with the adjustable spring disk 22 being pushed axially down. This leads to lifting of the body 16 in a mechanically dictated amount.

At the same time, the threaded nut 36 with the overload spring 32 is turned relative to the bracket 26 and to the threaded sleeve 26b by way of the gear drive 70, the flexible shaft 72 and the gear drive 42, by which the overload spring 32 is likewise shifted axially down in a controlled manner. This results in the overload spring 32 coming into contact with the shock absorber tube 14a earlier (compared to the normal level) and limiting the mechanically dictated deflection path. Compression of the bearing spring 12 to the maximum degree is thus avoided (the situation is shown in FIG. 1).

If the body of the vehicle is adjusted to the low level, the threaded nut 64 with the spring disk 22 being adjusted axially upward relative to the normal level position by the reversal of the direction of rotation of the electric motor 44 when the overload spring 32 is unchanged, it would be used earlier and would possibly cause uncomfortable driving behavior of the motor vehicle.

By the simultaneous adjustment of the overload spring 32 by way of the threaded nut 36, however, the overload spring 32 is shifted up and thus comes into use later compared to the normal level position, so that viewed over the entire deflection path of the wheel suspension a mechanically dictated, progressive spring constant first of the bearing spring 12 and then with the overload spring 32 is achieved.

By the following of the overload spring 32 depending on the height adjustment of the body of the vehicle the bearing spring 12 can be laid out with respect to its design and geometrical dimensions to an improved degree for the structural conditions in the wheel suspension (e.g., overall length, outside diameter, etc.) so that limitations of the spring path can be avoided. Furthermore, the total spring constant of the wheel suspension and, by association, the driving comfort of the vehicle matched to different level positions can be favorably influenced.

The transmission ratio between the axial adjustment of the bearing spring 12 and of the adjustable spring disk 22 for axial adjustment of the overload spring 32 can be designed depending on the structural conditions of the wheel suspension with the wheel carrier 10 to be 1:1 or diverging therefrom. This can be accomplished by way of the design of the gear drives 70, 42 and by the selected pitches in the ball screw 46 and positioning drive 34 on the overload spring 32.

The overload spring 32 can optionally also be formed by a further, correspondingly arranged helical compression spring.

The toothed-gear drives 42, 70 can be protected in a manner which is not shown by enclosures which have optionally been produced from plastic or rubber-elastic protective sleeves against environmental fouling, moisture, etc.

What is claimed is:

1. A device for adjusting the height from the ground of the body of a motor vehicle having a bearing spring which is connected between a wheel guiding element of the wheel suspension and the body and which is supported on a spring disk which is vertically adjustable by way of an actuating device, and having an overload spring which limits a defined spring path in the deflection direction wherein the overload spring is provided with the actuating device, with which the overload spring is vertically adjustable, following the vertical adjustment of the spring disk, and wherein the bearing spring and the actuating device on the body side are located and coupled to a lower lying longitudinal member of the body of the vehicle and a shock absorber with the overload spring is located and coupled higher on a side wall of the body which adjoins the longitudinal member, and the toothed-gear drives of the overload spring and of the actuating device are coupled to one another by way of a flexible shaft.

2. The device according to claim 1 wherein the overload spring can be adjusted in height dynamically coupled to the spring disk.

3. The device according to claim 1 wherein the overload spring and the spring disk are operatively connected to the actuating device.

4. The device according to claim 1 wherein the overload spring is coupled to the actuating device such that with adjustment of the height of the body, the overload spring is also adjusted to maintain the essentially same spring path.

5. The device according to claim 1 wherein the overload spring is located between a body-side shock absorber bearing of a telescoping shock absorber of the wheel suspension and its shock absorber cylinder and/or the overload spring is axially adjustable by way of the actuating device.

6. The device according to claim 1 wherein the overload spring is axially movable by way of a positioning drive and the positioning drive is drivingly connected to the actuating device of the bearing spring.

7. The device according to claim 6 wherein the actuating device is an electric-motorized actuator with a ball screw which acts on the bearing spring and whose threaded nut which is axially movable by way of a rotatable threaded spindle interacts with the adjustable spring disk of the bearing spring and that the threaded spindle is drivingly coupled to the positioning drive of the overload spring.

8. The device according to claim 1 wherein for the wheel suspension with the bearing spring and the overload spring which are spatially separated from one another, the positioning drive of the overload spring and the actuating device are coupled to one another by means of a flexible, torsion-resistant shaft.

9. The device according to claim 6 wherein the positioning drive of the overload spring is formed by a threaded drive with a threaded sleeve which is supported on the body side and a threaded nut which can be turned to the sleeve and which holds the overload spring.

10. The device according to claim 7 wherein the threaded spindle of the ball screw drives the positioning drive of the overload spring by way of a toothed-gear drive.

11. The device according to claim 9 wherein the toothed-gear drive on the actuating device and/or on the positioning drive of the overload spring is a spur gear drive whose pinions are drivingly interconnected by way of the flexible shaft.

12. The device according to claim 1 wherein the bearing spring is supported on the wheel suspension side on an extension arm of the wheel carrier of the wheel suspension, which arm is aligned substantially horizontally and to the vertical longitudinal center plane of the vehicle and the shock absorber with its shock absorber tube is articulated to a bracket of the wheel carrier which lies above it.

13. An assembly for adjusting the height from the ground of the body of a motor vehicle having a spring supported on a component of a wheel suspension system of said vehicle and a first body portion of said vehicle, and a telescopic shock absorber having a cylinder portion connected to a second component of said wheel suspension system and a piston portion connected second body portion of said vehicle, comprising:

first means disposed between said spring and said first body portion of said vehicle, for varying the spacing between said spring and said first body portion of said vehicle along an axis of said spring;

second means disposed between said cylinder portion of said shock absorber and said second body portion of said vehicle for varying the spacing between said cylinder portion of said shock absorber and said second body portion of said vehicle along an axis of said shock absorber;

resilient means disposed between said second means and said cylinder portion of said shock absorber; and means for anslating motion of said first means to motion of said second means.

14. An assembly according to claim 13 wherein said first means include a first annular member, a second annular member, a ball and screw mechanism operatively interconnecting said annular members and a motor supplied on said first body portion of said vehicle drivingly connected to one of said annular members.

15. An assembly according to claim 14 wherein said means for translating motion from said first means to said second means comprises a flexible cable operatively interconnecting said first and second means for transmitting rotary motion from said first means to said second means.

16. An assembly according to claim 15 wherein said second means includes means for translating rotary motion of said flexible cable to linear motion of said second means.

17. An assembly according to claim 16 wherein said means for translating rotary motion to linear motion comprises a threaded connection between said second means and said second body portion, and a spur gear supported on said second body portion, rotationally drivable by said flexible cable and meshing with a gear section of said second means.

18. An assembly according to claim 17 wherein said second means has a cup-shaped configuration.

19. An assembly according to claim 18 wherein said piston portion projects through an opening in a base portion of said second means, said resilient means is disposed between said base portion of said second means and said cylinder portion of said shock absorber and a second resilient means is disposed between said piston portion and said second body portion.

* * * * *